United States Patent [19]

Kaszubinski

[11] Patent Number: 5,201,414

[45] Date of Patent: Apr. 13, 1993

[54] COMPACT DISC STORAGE APPARATUS

[76] Inventor: Richard R. Kaszubinski, 103 Palmer St., Passaic, N.J. 07055

[21] Appl. No.: 881,173

[22] Filed: May 11, 1992

[51] Int. Cl.⁵ .................................... B65D 85/57
[52] U.S. Cl. .................... 206/309; 206/425; 206/444; 220/533; 211/40
[58] Field of Search .......... 206/309, 425, 444, 454, 206/561, 564; 220/532, 533; 211/40, 41

[56] References Cited

U.S. PATENT DOCUMENTS

| | | | |
|---|---|---|---|
| 3,812,975 | 5/1974 | Gutierrez | 211/40 |
| 4,234,089 | 11/1980 | Morris | 206/561 |
| 4,511,194 | 4/1985 | Park et al. | 206/309 |
| 4,595,098 | 6/1986 | Kryter | 206/454 |
| 4,722,453 | 2/1988 | Hamilton | 206/425 |
| 4,776,482 | 10/1988 | Wolters et al. | 206/444 |
| 4,778,047 | 10/1988 | Lay | 206/309 |
| 4,781,292 | 11/1988 | Sacherman et al. | 206/425 |
| 4,928,818 | 5/1990 | Friess et al. | 206/309 |
| 5,027,950 | 7/1991 | Gutierrez et al. | 206/425 |

FOREIGN PATENT DOCUMENTS

| | | | |
|---|---|---|---|
| 334457 | 9/1989 | European Pat. Off. | 206/444 |
| 376841 | 7/1990 | European Pat. Off. | 206/444 |
| 214568 | 9/1987 | Japan | 206/309 |

*Primary Examiner*—David T. Fidei
*Attorney, Agent, or Firm*—Leon Gilden

[57] ABSTRACT

A housing including a floor of a container having a lid mounted thereto, the floor including at least one elongate support track, with the support track having spaced, parallel semi-cylindrical grooves to receive a roller rotatably mounted to a lower edge of a holder member, with the holder member arranged with a U-shaped groove mounted medially of the holder to receive a compact disc.

4 Claims, 4 Drawing Sheets

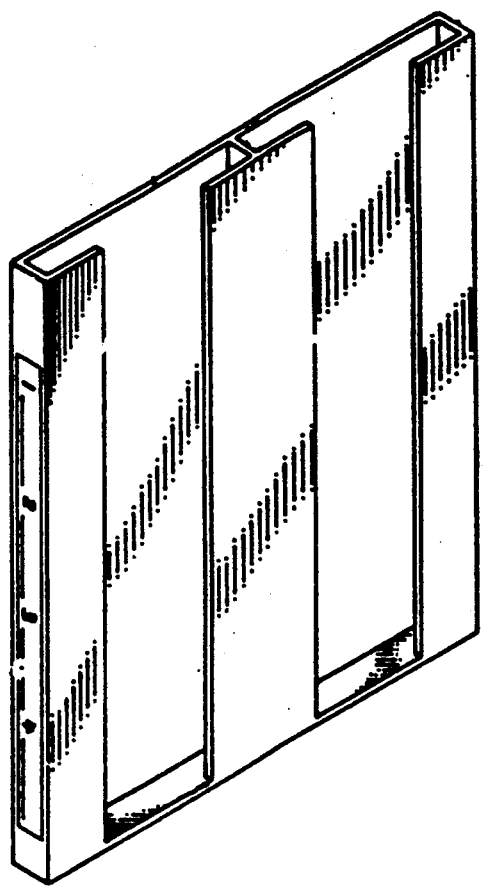
FIG 1
PRIOR ART
FIG 2
PRIOR ART
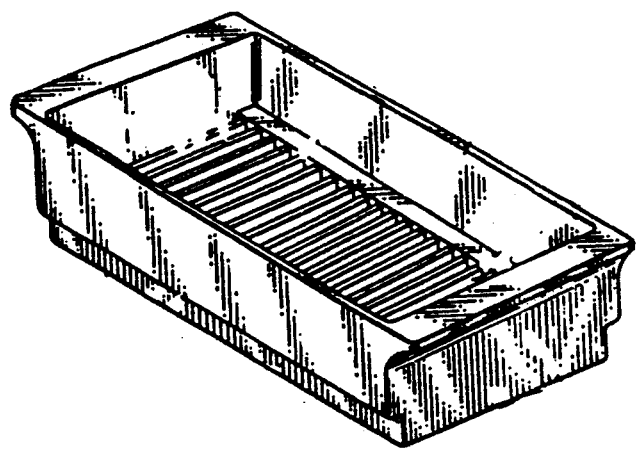
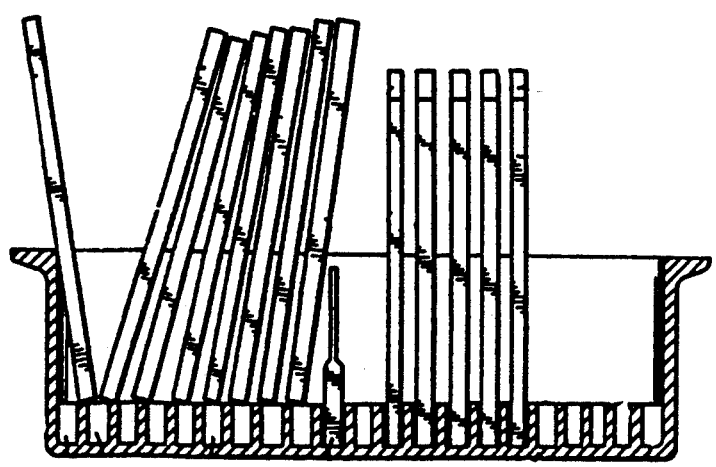
FIG 3
PRIOR ART

COMPACT DISC STORAGE APPARATUS

BACKGROUND OF THE INVENTION

1. Field of the Invention

The field of invention relates to storage apparatus, and more particularly pertains to a new and improved compact disc storage apparatus wherein the same permits storage of an elongate row of compact discs without use of a compact disc storage container.

2. Description of the Prior Art

Compact discs, due to their size and construction, occupy a great deal less room than conventional auditory reproduction components. The typical container of a compact disc requires use of a greater area of storage than the disc itself, and accordingly the instant invention attempts to overcome deficiencies of the prior art by providing storage of the compact disc without resort to their holders. Prior art apparatus directed to the storage of such compact discs and their associated holders are directed to and found in the U.S. Pat. Nos. 4,712,679; 4,928,818; 4,708,239; and 4,842,032.

Accordingly, it may be appreciated that there continues to be a need for a new and improved compact disc storage apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of compact disc storage apparatus now present in the prior art, the present invention provides a compact disc storage apparatus wherein the same accommodates an elongate row of compact disc members not resorted to the associated holder thereof. As such, the general purpose of the present invention, which will be described subsequently in greater detail, is to provide a new and improved compact disc storage apparatus which has all the advantages of the prior art compact disc storage apparatus and none of the disadvantages.

To attain this, the present invention provides a housing including a floor of a container having a lid mounted thereto, the floor including at least one elongate support track, with the support track having spaced, parallel semi-cylindrical grooves to receive a roller rotatably mounted to a lower edge of a holder member, with the holder member arranged with a U-shaped groove mounted medially of the holder to receive a compact disc.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compact disc storage apparatus which has all the advantages of the prior art compact disc storage apparatus and none of the disadvantages.

It is another object of the present invention to provide a new and improved compact disc storage apparatus which may be easily and efficiently manufactured and marketed.

It is a further object of the present invention to provide a new and improved compact disc storage apparatus which is of a durable and reliable construction.

An even further object of the present invention is to provide a new and improved compact disc storage apparatus which is susceptible of a low cost of manufacture with regard to both materials and labor, and which accordingly is then susceptible of low prices of sale to the consuming public, thereby making such compact disc storage apparatus economically available to the buying public.

Still yet another object of the present invention is to provide a new and improved compact disc storage apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art compact disc storage member.

FIG. 2 is an isometric illustration of a compact disc storage tray structure.

FIG. 3 is an orthographic side view of the compact disc storage tray, as utilized by the prior art and as set forth in FIG. 2.

DESCRIPTION OF THE PREFERRED EMBODIMENT

Figure 4:
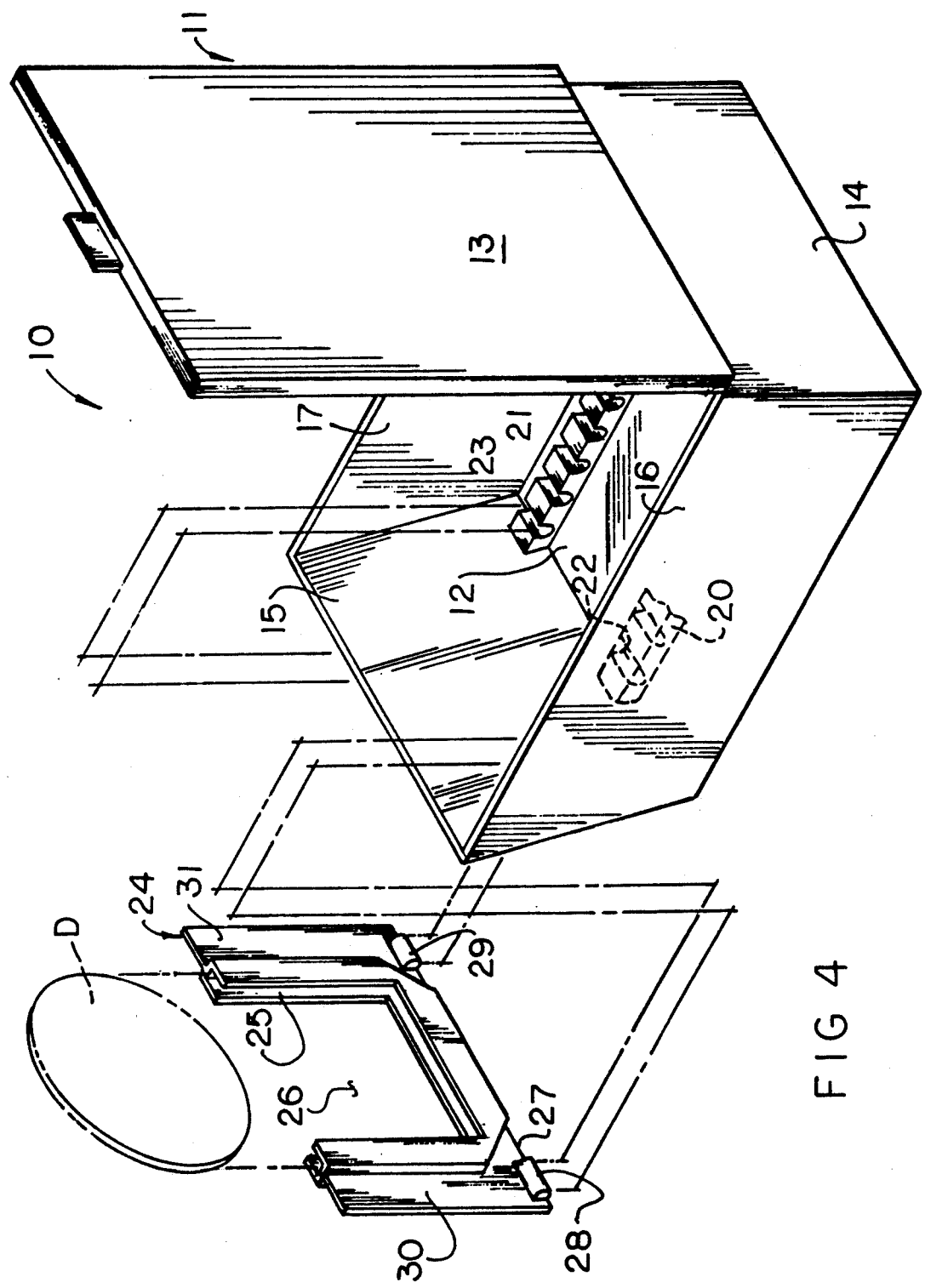
FIG. 4 is an isometric illustration of the instant invention.

With reference now to the drawings, and in particular to FIGS. 1 to 6 thereof, a new and improved compact disc storage apparatus embodying the principles and concepts of the present invention and generally designated by the reference numerals 10 and 10a will be described.

FIG. 1 is an isometric illustration of a prior art support holder, as set forth in U.S. Pat. No. 4,928,818, to accommodate a compact disc member and holder therewithin. The FIGS. 2 and 3 illustrate the prior art structure as set forth in U.S. Pat. No. 4,712,679 to indicate conventional compact disc holder members for receiving the housings of the compact discs in an elongate row.

More specifically, the compact disc storage apparatus 10 of the instant invention essentially comprises a housing 11 having a floor 12, including a rear wall 14 spaced from a forward wall 15 that is canted forwardly of the floor 12 to define an obtuse angle therebetween. Spaced parallel side walls, to include a first side wall 16 and a second side wall 17, extend upwardly on opposed sides of the floor to define the container cavity to receive the various disc holders therewithin, to be described in more detail below. A lid 13 is removably mounted relative to an upper peripheral edge of the container defined by the upper coplanar edges of the rear wall 14, forward wall 15, and the side walls 16 and 17.

Figure 5:
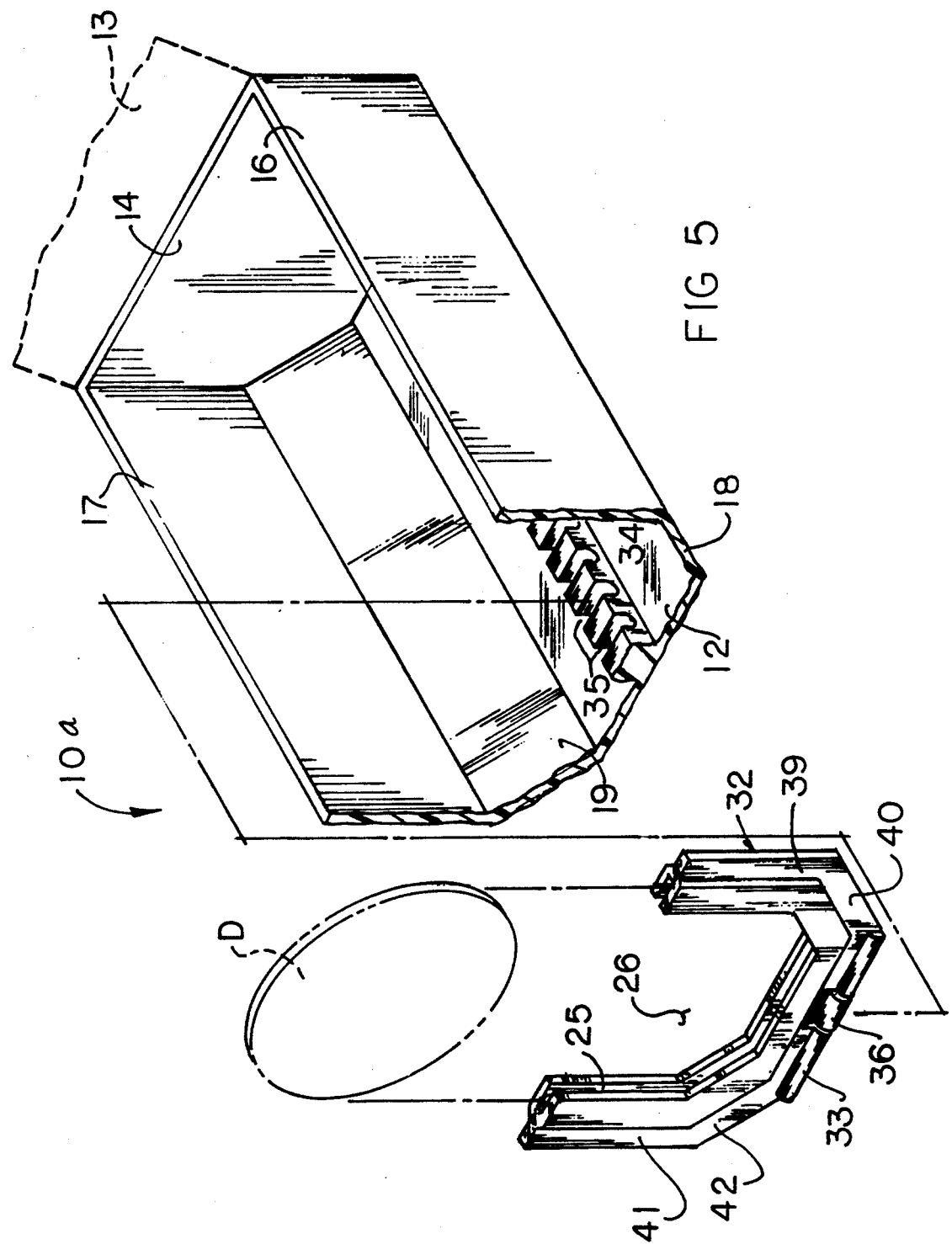
FIG. 5 is an isometric illustration of a modified aspect of the invention.

The container structure, as illustrated in FIG. 5, may be also employed that in addition to the construction as illustrated in FIG. 4, has the first and second side walls 16 and 17 including lower first and second side walls 18 and 19 respectively joined to respective lower edges of the first and second side walls 16 and 17, with the lower side walls 18 and 19 merging into the floor 12. Further, a predetermined obtuse included angle is defined between the first side wall 16 and the lower first side wall 18, as well as the first side wall 17 and the lower first side wall 19. The connection of the lower first side walls 18 and 19 to the floor 12 are effected also at a yet further predetermined obtuse angle.

The housing, as illustrated in FIG. 4, includes respective first and second support tracks 20 and 21 that are arranged in respective adjacency to the first and second side walls 16 and 17 fixedly mounted to the floor 12 extending coextensively between the forward wall 15 and the rear wall 14. The tracks are in the parallel relationship relative to one another to include respective first and second grooves 22 and 23 coextensively along the tracks. Each of said first grooves 22 is coaxially aligned with one of said second grooves 23 to define pairs of grooves. These pairs of grooves each pivotally mount a holder 24 of a generally U-shaped configuration. The holder 24 is formed with a holder opening 26 directed into the holder from an upper distal end thereof having a U-shaped slot 25 formed into the holder 24 about the holder opening 26. This U-shaped slot is formed to accommodate an associated compact disc "D" therewithin. The holder's lower edge 27 is arranged to include a first and second roller 28 and 29 that are spaced apart a predetermined spacing equal to a predetermined spacing between the first and second support tracks 20 and 21. As each holder 24 has its first roller 28 positioned within a first groove 22, the second roller 29 is positioned within an associated second groove 23 to pivotally mount the holder structure within the container organization of the housing 11. Notably, the holder is formed with a respective first and second leg 30 and 31 that is spaced apart a predetermined length equal to the predetermined length between the side walls 16 and 17 to position the holder structure within the associated container of the housing 11.

The container structure, as illustrated in the FIG. 5, is arranged to provide the use of a single central track 34 having spaced parallel semi-cylindrical grooves 35 directed coextensively between a forward wall 15 (not shown) of the construction as set forth in FIG. 4 to the rear wall 14. The modified holder structure 32 utilized with the container structure, as illustrated in FIG. 5, requires only the utilization of a central roller 36 rotatably mounted to a lower edge of the holder 32 coaxially aligned within a lower edge roller 33 that is coextensively mounted to the lower edge of the holder to afford desired alignment of the holder relative to the floor 12 of the container, as well as to the side walls. The modified holder 32 is also of a generally U-shaped configuration and includes a first upper leg 39 mounted to a first lower leg 40 defining the further obtuse included angle therebetween, as spaced from a second upper leg 41 mounted to a second lower leg 42 defining the further predetermined obtuse angle therebetween. The first lower leg 40 and the second lower leg 42 define the yet further obtuse included angle relative to the base of the holder 32. Similarly, the opening 26 includes the U-shaped groove 25 to accommodate the compact disc "D" therewithin. The obtuse angular structure of the holder legs affords stability and alignment of the holder structure within the container, and more specifically between the side walls of the container as the first and second upper side walls 16 and 17 in the construction of the FIG. 5 container are spaced apart the aforenoted predetermined length equal to the predetermined width of the holder 32 to complementarily receive the holder 32 within the container structure.

Figure 6:
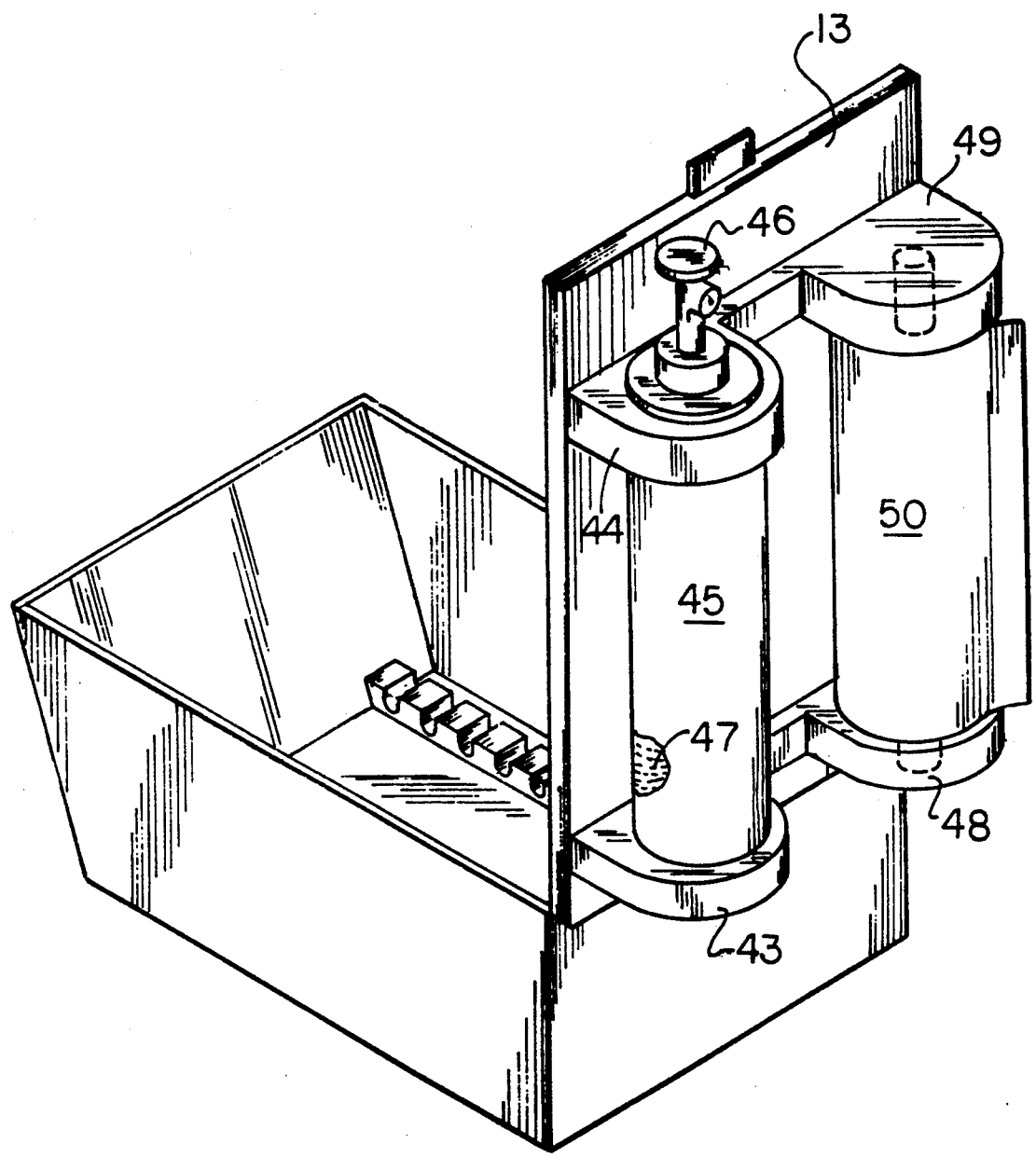
FIG. 6 is a further modified aspect of the lid structure of the invention.

The FIG. 6 illustrates the invention further including a first lower base plate 43 spaced from and parallel a first upper base plate 44 mounting a fluid reservoir 45 therebetween having any desired commercial fluid cleaner 47 therewithin. A spray head 46 mounted to the reservoir 45 in fluid communication therewith permits the spraying of fluid cleaner onto an associated compact disc. A second lower base plate 48 spaced from a second upper base plate 49 mounts a fibrous roll 50 of towels to provide for lint-free cleaning of the compact disc members to permit such cleaning prior to storage of such compact discs to promote their longevity. The organizational structure of the lid 13, as illustrated in the FIG. 6, is employed by the container of the FIG. 5, in a manner as described above.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A compact disc storage apparatus, comprising,
    a housing, the housing having a floor, the floor including a rear wall, a first side wall spaced from a second side wall a predetermined length, and a forward wall, the forward wall canted at a first obtuse angle relative to the floor projecting beyond the floor, and
    the floor including at least one track, the track having spaced parallel grooves directed therethrough, the grooves oriented orthogonally relative to the first side wall and the second side wall, and the track directed coextensively along the floor, and
    at least one U-shaped holder, the U-shaped holder including a holder upper edge, the upper edge having a holder opening directed into the holder from the upper edge, and a U-shaped slot directed into the holder at the opening, and
    the holder defined by a holder width equal to the predetermined length between the first side wall and the second side wall, and
    the holder including a holder lower edge, the lower edge including at least one roller, the roller arranged for reception within at least one of said grooves.

2. An apparatus as set forth in claim 1 wherein the lower edge includes a lower edge roller, the central roller positioned medially of and coaxially aligned relative to the lower edge roller, with the lower edge roller arranged for abutment with the floor to align the holder relative to the floor.

3. An apparatus as set forth in claim 2 wherein the first side wall includes a lower first side wall, the second side wall includes a lower second side wall, the lower first side wall arranged at a first obtuse included angle between the first side wall and the lower first side wall, the second side wall and the lower second side wall defining said first obtuse included angle therebetween, and the lower first side wall secured to the floor at a second obtuse included angle, and the lower second side wall joined to said floor defining said second obtuse included angle therebetween, and said U-shaped holder including a holder first leg and a holder lower first leg, the holder first leg and the holder lower first leg joined at said first included obtuse angle therebetween, and the holder including a holder second leg and a holder lower second leg, the holder second leg joined to said holder lower second leg to define said obtuse included angle therebetween, and said holder lower first leg and said lower second leg joined to said holder lower edge to define said second obtuse included angle.

4. An apparatus as set forth in claim 3 wherein said first side wall, said second side wall, said rear wall, and said forward wall define a coplanar upper continuous edge, and a lid removably mounted relative to said continuous edge, said lid including a lid first lower base plate spaced from and parallel a lid first upper base plate, and a lid second lower base plate spaced from a lid second upper base plate, and a fluid reservoir mounted between said first lower base plate and said first upper base plate, and said reservoir having a fluid cleaner therewithin, and a spray head mounted to said reservoir in fluid communication therewith, and said second lower base plate and said second upper base plate mounted rotatably a fibrous towel roll therebetween.

* * * * *